F. A. CLEMONS.
STOCK WATERER.
APPLICATION FILED JULY 8, 1919.
1,353,146. Patented Sept. 21, 1920.
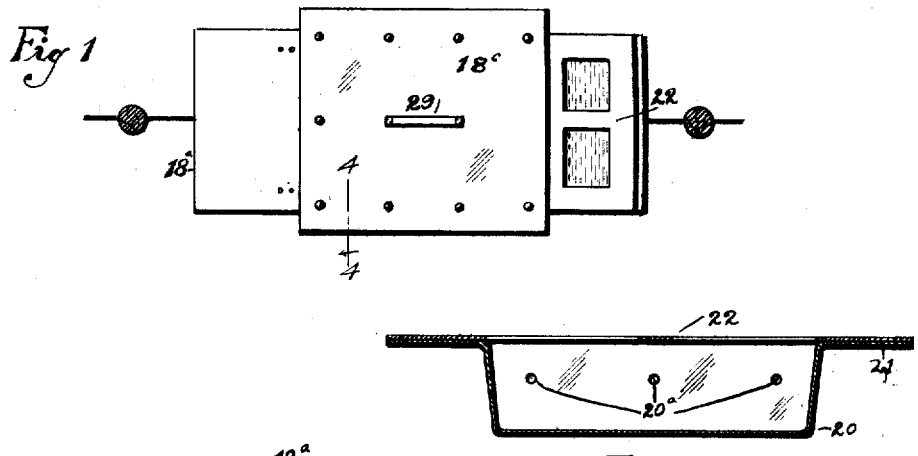
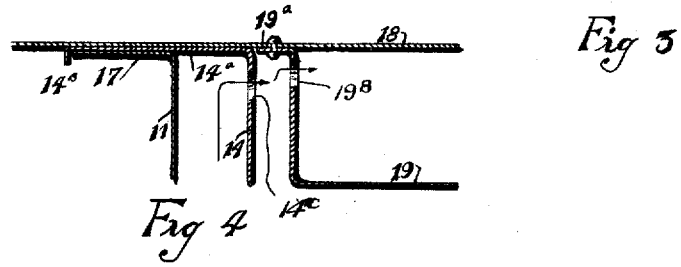
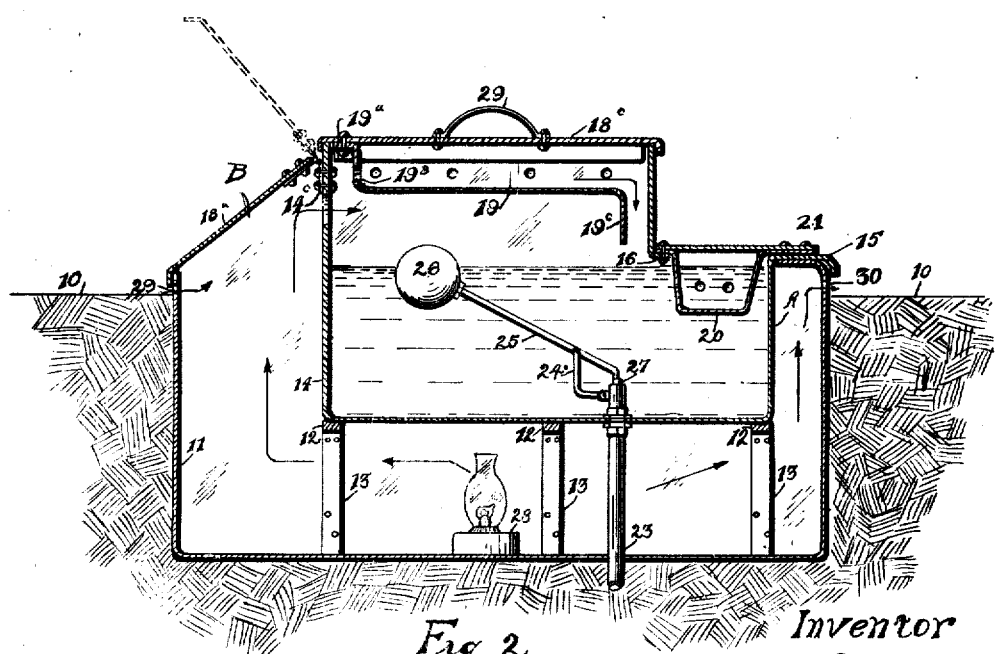
Witness
John Nehr.
Inventor
Fay A. Clemons
By Owen & Bair, Attys

UNITED STATES PATENT OFFICE.

FAY A. CLEMONS, OF CLEMONS, IOWA.

STOCK-WATERER.

1,353,146.  Specification of Letters Patent.  Patented Sept. 21, 1920.

Application filed July 8, 1919. Serial No. 309,398.

*To all whom it may concern:*

Be it known that I, FAY A. CLEMONS, a citizen of the United States, and a resident of Clemons, in the county of Marshall and State of Iowa, have invented a certain new and useful Stock-Waterer, of which the following is a specification.

The object of my invention is to provide a stock waterer of the type designed to be sunk partially into the ground and having a tank or water container received within a suitable casing and substantially spaced therefrom, so as to leave a space for the circulation of warm air in the casing surrounding the tank.

A further object is to provide such a stock waterer having a relatively small portion of the tank arranged to receive a drinking trough seated outside the casing, so that the drinking trough will be largely received within the main body of water, whereby the entire body of water including that in the trough may be properly heated.

Still a further object is to provide in such a structure a removable drinking trough, so constructed and arranged that it may be partially submerged in the main body of water with its interior in communication with the main body of water, which trough, however, is so constructed that dirt and debris collecting therein will not get into the main trough.

A further object is to provide such a structure which can be placed at a line fence between two lots or pastures so that a single trough may be used by stock in both lots.

Still a further object is to provide a structure of the kind mentioned, so constructed and arranged that the trough will be readily available to stock for drinking purposes, and yet whereby the main body of water will be protected from access by small animals, so that there is no danger of small stock being drowned.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a stock waterer embodying my invention.

Fig. 2 shows a vertical, sectional view through the stock waterer.

Fig. 3 shows a longitudinal, sectional view through the trough.

Fig. 4 shows a detail, sectional view taken on the line 4—4 of Fig. 1.

In the accompanying drawings I have used the reference numeral 10 to indicate generally the surface of the ground in which my improved stock waterer is sunk.

The stock waterer consists of a casing or container 11 designed to be sunk into the ground with its upper edge projecting slightly above the surface of the ground.

Within the casing 11 and extending from side to side and secured to the side wall thereof above the bottom of said casing, are supporting strips or the like 12. The strips 12 may be secured to the side walls of the casing 11 by means of flanges 13 which extend to the bottom of the casing.

Supported on the strips 12 is a water tank 14, spaced from the sides and ends of the casing.

The tank 14 has a portion indicated generally by the reference character A at one end which terminates at a point lower than the top of the main body of the tank.

At one end of the portion A is a laterally extending flange 15, which extends over what may be called the front wall of the casing 11, as shown in Fig. 2.

The portion A has a laterally elongated opening to receive the trough hereinafter referred to.

At the opposite side of said opening from the flange 15 is a horizontal flange 16 which helps support the trough.

The casing 11 has at its side at its upper edge laterally extending flanges 17, as illustrated in Fig. 4.

The side walls of the central portions of the casing extend above the end walls, as illustrated particularly in Fig. 2, and the upper edges of the side walls near the rear end of the casing are inclined as at B.

The upper edges of the tank 14 at the side edges are formed with laterally extending flanges 14ᵃ which rest on the flanges 17, and terminate in down turned flanges 14ᵇ just outside the flanges 17, as shown in Fig. 4.

I provide for my casing a cover 18 of special construction having near its rear end the inclined portion 18ᵇ.

On the under side of the cover portion, which is above the tank 14, when the parts are installed, I have secured a false cover member 19, which, at its rear and side edges is provided with flanges 19ª which are riveted or otherwise properly secured to the cover 18.

The walls of the upper portion of the tank 14 and the cover member 19 are provided with a plurality of registering holes 14ᶜ and 19ᵇ to permit free circulation of air in the manner hereinafter more fully referred to.

At the forward portion of the false cover member 19 is a downwardly extending flange 19ᶜ which is spaced from the wall of the tank 14.

Received in the opening in the top of the forward part of the tank is a sanitary removable drinking trough or cup 20 having at its upper edge a laterally extending circumferential flange 21 which rests upon the flanges 16 and 15. The cup or trough 20 has at its top a transverse partition member 22 for dividing the trough into two compartments for keeping the animals apart when drinking.

In the installation of my waterer, a water supply pipe 23, buried in the ground, is extended through the bottom of the casing 11 and thence through the bottom of the tank 14.

Mounted on the upper end of the pipe 23 within the tank 14 is a bracket 24 to which is pivoted a lever arm 25 having at one end the float 26, and at the other end the float controlled valve 27.

Placed in the lower part of the casing 11 is a suitable heating element 28. The cover 18 may be provided with handles or the like 29 for convenience in removing and installing the cover.

In the practical use of my improved stock waterer, it will be understood that after the parts have been assembled and installed in the manner hereinbefore described, water will flow into the tank through the pipe 23 until the float 26 is raised to the proper point for closing the valve 27.

The water will then be at such a level that it will flow through the holes 20ª in the sanitary cup or trough for furnishing a supply of water accessible to stock.

My stock waterer may be placed along a line fence, so that one end of the sanitary cup will project on one side of the fence and the other end on the other side of the fence, so that animals in two different lots may use my waterer.

In cold weather it will be seen that the cover may be readily removed for permitting the heating element 28 to be inserted between the rear walls of the tank and casing and spaced beneath the tank 14.

The cover may then be replaced, and the heating element will start a circulation of air upwardly around the sides and ends of the tank 14. The air will pass through the opening 14ᶜ and 19ᵇ to the space between the cover 18 and the false cover 19, and will move forwardly to the forward end of the cover and thence downwardly between the flange 19ᶜ and the wall of the tank into the upper interior of the tank.

The casing wall may be provided with suitable ventilation openings 29 and 30 for admitting fresh air and permitting the exit of air.

It will be seen that with a waterer of this type, water is held in one body which makes it possible to utilize the heat from the heating element 28 to the best advantage.

I do away with the separating of the water into larger and smaller bodies, and therefore, with the danger of freezing a small body of water in a drinking trough or the like.

The water in my drinking cup circulates freely into and out of the tank and will remain substantially as warm as the water in the tank.

With a structure of this kind there is no danger of freezing the water in the drinking trough.

Where this structure is used there is involved the problem of keeping dirt and debris out of the main body of the tank. I have accomplished the purpose of keeping the tank free from dirt and the like, while at the same time setting the sanitary drinking cup or trough into the main tank, by providing the openings 20ª spaced substantially above the bottom of the drinking trough. With this construction any dirt that gets into the drinking trough will drop to the bottom thereof, and the drinking trough may easily be lifted out and replaced and very little if any dirt will get into the main tank. This I consider an important feature of my invention.

It will be noticed also that small animals can have no access, with a waterer of this kind, to the main tank, nor can they get into the water deep enough so that they might be drowned.

My device is of comparatively simple construction and when once installed will not readily get out of order.

By disconnecting the lever arm 25 from the bracket 24, by means of a removable bolt or the like, it will be seen that it will then be possible to lift out the water tank for purposes of repair or replacements.

My casing and tank may be made of any suitable material and in any desired size, and in a great variety of shapes.

The cover portion 18ª may be hinged at its upper edge if desired, so that said portion may be readily raised or lowered for handling the heating element.

In fact changes may be made in the construction and arrangement of the various parts of my improved stock waterer without departing from the essential spirit and purposes of my invention, and it is my intention to cover by my claims any modified forms of structure or use of mechanical equivalents which may be reasonably included within their scope.

I claim as my invention:

1. A stock waterer comprising a casing, a tank supported in the casing and adapted to be spaced from the walls of the casing for providing air spaces around the tank, a removable cover for said casing and tank having a false cover member spaced from the main body of the cover member, and terminating short of its forward edge, said tank having near its upper edges openings and said cover member having corresponding openings for permitting the circulation of air between the false cover and the main body of the cover.

2. A stock waterer comprising a casing, a tank supported within the casing and adapted to be spaced from the walls of said casing, a removable cover member, said cover member being provided with a false cover member spaced therefrom, and terminating short of its forward edge, said tank and cover member being provided with means whereby air from below the tank may circulate around the tank and circulate into the tank and between the cover members for making a complete circulation of air around the water within the tank.

3. A stock waterer comprising a casing, a tank supported within the casing and adapted to be spaced from the walls of said casing, a removable cover member, said cover member being provided with a false cover member spaced therefrom, said false member terminating short of the forward edge of the cover and provided with a downwardly extending portion, said tank and cover member being provided with substantially registering openings whereby air from within the casing will circulate through the openings in the tank and in between the cover member and the downwardly extending portion of the false member and thence be discharged over the surface of the water within the tank.

4. A stock waterer comprising a casing designed to be sunk in the ground, a tank supported within said casing and formed with an opening adapted to receive a drinking trough, a removable cover provided with a false cover member over said tank, said tank being spaced from the walls of the casing and provided with openings near its upper edges, the false cover member being provided with openings adjacent to said first described openings, whereby a circulation of air may circulate around the tank and between the cover member and false cover member and thence be discharged over the surface of the water within the tank adjacent to the exposed portion of the water.

5. A stock waterer comprising a casing having a tank supported therein and adapted to be spaced therefrom, a removable cover having a false member spaced therefrom, the false member having a downwardly extending portion adapted to be spaced from the wall of the tank and to terminate slightly above the level of the water, the tank and cover member being provided with substantially registering openings, whereby air may circulate from within the casing through the openings in the tank and cover member and be discharged between the tank and the downwardly extending portion over the water within the tank, the parts being so arranged that the heated air from the cover member will be discharged substantially at the coldest point in the body of water.

Des Moines, Iowa, June 18, 1919.

FAY A. CLEMONS.